United States Patent [19]
Ottenberg

[11] Patent Number: 4,463,020
[45] Date of Patent: Jul. 31, 1984

[54] YEAST-RAISABLE WHEAT-BASED FOOD PRODUCTS THAT EXHIBIT REDUCED DETERIORATION IN PALATABILITY UPON EXPOSURE TO MICROWAVE ENERGY

[75] Inventor: Ray Ottenberg, Washington, D.C.

[73] Assignee: Lee Ottenberg, Bethesda, Md.; a part interest

[21] Appl. No.: 407,621

[22] Filed: Aug. 12, 1982

[51] Int. Cl.$^3$ .................... A21D 8/00; A21D 13/00
[52] U.S. Cl. .................................. 426/19; 426/27; 426/62; 426/243; 426/391; 426/549
[58] Field of Search .................. 426/19, 18, 20, 21, 426/27, 62, 233, 241, 243, 391, 439, 446, 496, 497, 549, 622

[56] References Cited

U.S. PATENT DOCUMENTS

| | | |
|---|---|---|
| 1,234,858 | 7/1917 | Blacklock . |
| 1,263,609 | 4/1918 | Schuyler . |
| 2,041,129 | 5/1936 | Hoffman . |
| 3,076,710 | 2/1963 | Koolhaas . |
| 3,630,755 | 12/1971 | Schiffmann et al. . |
| 3,752,675 | 8/1973 | Tsen et al. ............... 426/21 |
| 4,157,403 | 6/1979 | Schiffmann et al. . |
| 4,318,931 | 3/1982 | Schiffmann et al. . |

FOREIGN PATENT DOCUMENTS 2812183  9/1979  Fed. Rep. of Germany ........ 421/26

OTHER PUBLICATIONS

"Reformulating for Microwaves," *Food Technology*, vol. 25, 921, Sep. 1971.
"Frozen Breads Could Be (Micro)Wave of the Future," *Bakers Digest*, Oct. 1980, pp. 7-9, Patel, K. M.; Hellerback, C. M.; and Bergan, J. G.
"Preparation and Heating Techniques for Vended Food Items," from Microwave Food Vending Manual of Litton Microwave Cooking Products, Minneapolis, Minn., pp. 5-6.

*Primary Examiner*—Robert A. Yoncoskie
*Assistant Examiner*—Marianne S. Minnick
*Attorney, Agent, or Firm*—Finnegan, Henderson, Farabow, Garrett & Dunner

[57] ABSTRACT

Yeast-raised wheat-based food products comprising wheat flour, yeast and an amount of long-grain rice flour effective to reduce deterioration in the palatability of the food product caused by microwave energy. The food products are made by preparing a formulation including the above mentioned ingredients, mixing the formulation into a dough and baking the dough formulation for a time and a temperature sufficient to form a yeast-raised wheat-based food product. The yeast-raised wheat-based food products show vast improvement in palatability over conventionally prepared yeast-raised wheat-based food products upon exposure to microwave energy.

28 Claims, No Drawings

YEAST-RAISABLE WHEAT-BASED FOOD PRODUCTS THAT EXHIBIT REDUCED DETERIORATION IN PALATABILITY UPON EXPOSURE TO MICROWAVE ENERGY

FIELD OF THE INVENTION

This invention relates to new yeast-raised wheat-based food products, compositions, and their preparation and use. More particularly, this invention relates to yeast-raised wheat-based food products which exhibit resistance to deterioration in palatability caused by exposure to microwave energy and the formulation for and method of preparation of such food products.

BACKGROUND OF THE INVENTION

The use of microwave energy for heating food products has become widespread. Heating by microwave energy of yeast-raised wheat-based food products such as bread and roll products has likewise become widespread. Applications of microwave energy for heating machine vendable sandwiches and breakfast type rolls are visible examples of this current use.

Problems have arisen with the use of microwave energy for heating traditional yeast-raised wheat-based food products such as bread and roll products. Traditional bread and roll products become impalatable after short exposures to microwave energy. The term palatable or palatability refers to the eating quality of food products. Palatable food products are agreeable to the taste and possess an appetizing appearance and texture.

Upon exposure to microwave energy, the crust of traditional bread and roll products becomes extremely tough. The crust of such microwave exposed products may become so tough that it is difficult to tear such products. The bread product itself may become soggy or develop hard lumpy portions. The crumb of the products becomes rubbery and gummy and is difficult to chew. Consequently, traditional bread and roll products, upon exposure to microwave energy, are not palatable.

An article entitled "Reformulating for Microwave," 25 Food Technology 921, (Sept. 1971), describes the effect of microwaving on bread and suggests a reformulation for breads that are intended to be exposed to microwave energy. The article explains that the rate at which food products absorb microwave energy depends to a great measure on their moisture content. Products with high moisture contents, such as normal commercially baked sandwich rolls, heat very rapidly in a microwave oven. When filled sandwiches made with normal sandwich rolls are heated in a microwave oven, the rolls tend to overheat before the filling reaches serving temperature, substantially reducing the palatability of the overheated rolls.

Attempts have been made to deal with the problems associated with exposure of bread and roll products to microwave radiation, but have met with limited success. Methods for making bread and roll products for microwave applications have been tried using "rich" formulations. These "rich" formulations are low in water and high in sugar, shortening and egg. As suggested and described in the above-mentioned "Food Technology" article, buns prepared according to the "rich" formulation absorb microwave energy more slowly than do the traditional baked products, such as, normal sandwich rolls, because of the lower moisture content of the "rich" products.

Pre-toasting of the bread and roll products has also been used to further reduce the water content in an attempt to alleviate the problems caused by exposure of the products to microwave energy. Use of day-old bread has also been suggested for improving a bread's ability to absorb microwave energy since day-old bread loses some of its natural moisture as it grows stale.

While minimal improvements in palatability have been obtained with the above-described reduced-moisture products, these improvements are in no way satisfactory because the reduced moisture products continue to evidence substantial reduction in palatability upon warming by exposure to microwave energy. The methods described above have additional drawbacks. Utilization of a relatively expensive "rich" formula adds cost to production. Pre-toasting adds an additional step to bread preparation, increasing production cost and handling time. Use of day-old bread disadvantageously requires storage of bread for at least a day until it becomes sufficiently "stale".

It has now been found that yeast-raised wheat-based food products having improved resistance to deterioration in palatability upon exposure to microwave energy can be produced by use of yeast-raised wheat-based formulations that include rice flour.

SUMMARY OF THE INVENTION

It is therefore an object of the present invention to provide a yeast-raised wheat-based food product with improved resistance to deterioration in palatability due to exposure to microwave energy.

It is a further object of the invention to provide a formulation and a method for making a yeast-raised wheat-based food product which has improved resistance to deterioration in palatability upon exposure to microwave energy.

To achieve the objects in accordance with the purpose of the invention, as embodied and broadly described herein, the invention comprises a yeast-raised wheat-based food product comprising wheat flour, yeast and an amount of rice flour effective to reduce deterioration in the palatability of the food product upon exposure to microwave energy. In a preferred embodiment of the invention, the rice flour is a long-grain rice flour and the long-grain rice flour comprises from about five (5) to about sixty (60) percent by weight of the weight of the wheat flour in the product. In a more preferred embodiment, the long-grain rice flour comprises from about ten (10) to about twenty (20) percent by weight of the weight of the wheat flour in the product.

Preferred embodiments of the baked product of the invention further comprise vital wheat gluten and/or shortening. In a more preferred embodiment of the invention, the yeast-raised wheat-based food product comprises wheat flour, yeast, vital wheat gluten, water, shortening, salt and an amount of long-grain rice flour effective to reduce deterioration in the palatability of the food product caused by microwave energy. In the most preferred embodiment, the yeast-raised wheat-based food product further comprises egg, salt, mineral yeast food, malt, and syrup.

In preferred embodiments, the yeast-raised wheat-based food product is a white or dark bread product, such as but not limited to, white bread, rye bread, whole wheat bread, pumpernickel bread, raisin bread, pita bread, italian bread or french bread. In further preferred embodiments the yeast-raised wheat-based food product is a pizza crust. In further preferred embodiment the yeast-raised wheat-based food product is a roll, such as sandwich, hamburger, hot dog, submarine or Kaiser rolls.

As embodied and broadly described herein, the invention also comprises a method of making a yeast-raised wheat-based food product of the invention comprising the steps of preparing a formulation comprising wheat flour, yeast, and an amount of rice flour effective to reduce deterioration in the palatability of the bread product caused by microwave energy; mixing the formulation into a dough; and baking the dough formulation for a time and at a temperature sufficient to form a yeast-raised wheat-based food product.

In a preferred embodiment, the rice flour is a long-grain rice flour and the formulation further comprises vital wheat gluten and shortening. In a more preferred embodiment of the method the forumulation further includes water, syrup, salt, egg, malt, and mineral yeast food.

In a preferred method according to the invention, the rice flour is added to the formulation in an amount in a range from about five (5) to sixty (60), more preferably from about ten (10) to twenty (20), percent of the weight of the wheat flour in the baking formulation. In preferred methods according to the invention the formulation is mixed for four (4) to thirty (30), more preferrably for eight (8) to sixteen (16), minutes into a dough.

As embodied and broadly described herein, the invention also relates to a formulation for a yeast-raised wheat-based food product composition comprising a mixture of wheat flour, yeast and an amount of long-grain rice flour effective to reduce deterioration in the palatability of the bread product made from the formulation, the deterioration being caused by exposure to microwave energy. In preferred formulations, the amount of long-grain rice flour in the composition is in the range of from about 5 to 60, more preferably from about 10 to 20, percent of the weight of the wheat flour in the formulation. In further preferred embodiments of the invention, the mixture further comprises vital wheat gluten, shortening, and salt.

As embodied and broadly described herein, the invention further comprises a formulation for a yeast-raisable wheat-based dough composition and a mixture of ingredients usable for making the dough composition comprising a mixture of wheat flour, yeast and an amount of long-grain rice flour effective to reduce deterioration of a bread product made from the formulation upon exposure to microwave energy.

It is to be understood that both the foregoing general and the following detailed description are exemplary and explanatory only and are not intended to be restrictive of the invention as claimed.

DETAILED DESCRIPTION OF THE PREFERRED EMBODIMENTS

Reference will now be made in detail to the present preferred embodiments of the invention. An example of a preferred embodiment is included at the end of this description.

In accordance with the invention the yeast-raised wheat-based food product comprises wheat flour, yeast, and a component of rice flour effective to reduce deterioration in the palatability of the food product upon exposure to microwave energy. Preferably, the rice flour is a long-grain rice flour and comprises from about 5 to about 60 percent by weight of the weight of the wheat flour. More preferably, the long-grain rice flour is present in a range from about 10 to about 20 percent by weight of the weight of the wheat flour in the food product. The low range of the rice flour component is limited by the amount of long-grain rice flour that apparently needs to be present in order to provide significant resistance to the deterioration in palatability upon exposure of the food product to microwave energy. The upper range is limited by the amount of rice flour that the food product can contain and still remain yeast-raisable and have a wheat-based product flavor and texture.

It is the addition of the rice flour component which enables the wheat-based food product of the invention to resist deterioration in palatability upon exposure to microwave energy. "Long-grain" rice flour is preferred for use in the products of the invention; however, there does not appear to be any particular reason why short-grain or a mixture of long- and short-grain rice flour could not be advantageously used according to the invention.

Preferred yeast-raised wheat-based food products additionally comprise vital wheat gluten. Vital wheat gluten is highly concentrated gluten protein that is used as an additive to supplement and boost the amount of gluten present in a baked product. The vital wheat gluten is added so that the yeast-raised wheat-based food product will maintain its shape during yeast-raising without collapse. The vital wheat gluten also maintains the balance of the wheat-based formulation. Addition of an effecitve amount of vital wheat gluten compensates for the presence of non-gluten containing ingredients, such as the rice flour.

Preferred embodiments of the invention also contain shortening. Shortening or lubricating substitutes such as oil adds lubrication to food products so they may be easily sliced, chewed, and swallowed. Shortening or oil also provides lubrication for the mixing of flour and water into the dough, helping the dough retain natural gases that are utilized in the baking process. Overall, adding an effective amount of shortening or oil adds good taste and texture appeal to the wheat-based food products.

Preferred embodiments of the invention contain salt. Salt helps control fermentation of the yeast and provides flavor to the yeast-raised wheat-based food product.

Several other ingredients may be used to produce preferred embodiments of the invention. Sugar or syrup may be added to the food product to provide fermentable material to nourish the yeast and keep it active prior to and during the baking process. Eggs are added to the composition to provide improved taste to the wheat-based product. Specifically, eggs have been found to impart a bread-type flavor to the product of the invention. Malt is optionally added for coloring. Commercial sour, which is a cultivated bacteria culture, is optionally added for flavor.

Mineral yeast food is added to control fermentation and provide consistency to the finished products. Mineral yeast food finds most suitable application in commercial baking settings where less supervision of the yeast activity and uniform results are preferred. As well known in the art, water is a necessary ingredient for the preparation of wheat based food products, the amount of water added is chossen to achieve the moisture content desired for the particular food product intended.

The yeast-raised wheat-based food product according to the invention may be a roll-type product such as a Kaiser roll, breakfast roll, club roll, sandwich roll, etc. The yeast-raised wheat-based food product may also be a bread product, including for example, white or dark bread, such as rye bread, whole wheat bread, pumpernickel bread, raisin bread, pita bread, italian bread, french bread, etc. The yeast-raised wheat-based food product according to the invention may also be a pizza crust.

In accordance with the invention, the yeast-raised wheat-based food product, described above, is made by preparing a formulation comprising wheat flour, yeast and rice flour. Preferably the rice flour is long-grain rice flour. The preferred formulation comprises a mixture of all the other ingredients described above. The correct amounts, not specifically indicated above, of ingredients to be used to produce balanced baked products, are within the ordinary skill of one skilled in the baking art.

In accordance with the invention, the rice flour, preferably long-grain rice flour, is present in an amount effective to reduce deterioration in the palatability of the bread product upon exposure to microwaver energy. The preferred amounts of long-grain rice flour are described above.

In accordance with the invention, the formulation is mixed into a dough by any conventional mixing means. Preferably, the formulation is mixed by conventional mixing means for 4 to 30 minutes, more preferably for 8 to 16 minutes, into a dough.

Preferably, there is no substantial "floor time" between mixing and baking the formulation. "Floor time" for the purposes of the present invention means the idle time that the mixed dough product is required to wait before being shaped and proofed prior to being placed in an oven environment for baking. "Proofing" is a step for allowing shaped dough to rest, free from drafts, by covering, placing in a "proof box," etc., so the yeast can act to allow the dough to rise to a desired volume. While proofing time will vary to suit individual needs of the yeast-raised baked product desired, the proofing period will generally be in the range of 20 to 90 minutes.

In accordance with the invention, the dough formulation is baked for a time and at a temperature sufficient to form a yeast-raised wheat-based food product. Baking times, the type of oven used and temperature of the oven will vary according to the product desired and the personal baking preferences of the baker. Generally, the wheat-based food product is baked until a golden brown is achieved and a crust is developed. The yeast-raised wheat-based food products are then handled in any conventional manner to cool, pack and ship the final product.

The final food products produced according to the invention show resistance to deterioration in palatability upon exposure to microwave energy. Food products produced according to the present invention should maintain their good qualities of palatability upon exposure to microwave energy emitted by standard microwave ovens set at recommended heating settings for warming breads, rolls, pizza, and sandwiches.

EXAMPLE

The invention will now be illustrated by example. The example is not intended to be limiting of the scope of the present invention. In conjunction with the general and detailed descriptions above, the example provides further understanding of the present invention.

The following example illustrates the making of a yeast-raised wheat-based food product according to the invention. The food product according to the following example is an "Improved Kaiser Roll". The Improved Kaiser Roll is prepared by first mixing into a dough ingredients contained in the formula noted below. The formula is based on weight percents of the wheat flour used in the formulation. The wheat flour will be listed as 100 percent and each of the other ingredients will be listed as a weight percent in comparison to the weight of the wheat flour. The relative amount of ingredients used may also be viewed as pounds of ingredients per 100 pounds of wheat flour used.

| Improved Kaiser Roll Formula | |
|---|---|
| Ingredients | Percent of Ingredients Per 100% of Wheat Flour |
| Wheat flour (patent flour) | 100.00 |
| Long-grain rice flour | 15.00 |
| Water | 56.00 |
| Syrup | 8.00 |
| Shortening | 11.00 |
| Salt | 1.80 |
| Egg | 4.00 |
| Yeast | 4.00 |
| Malt | 1.00 |
| Vital wheat gluten | 1.00 |
| Mineral yeast food | .50 |
| Commercial sour | .50 |

The ingredients are mixed for approximately 12 minutes by any conventional mixing means suited to the volume of the ingredients used. The ingredients are mixed into a dough at a temperature of 78° F.

After the dough is mixed, the dough is then shaped to form the Improved Kaiser Rolls. There is no floor time necessary between mixing the dough, shaping the dough into rolls, and baking the dough into the Improved Kaiser Rolls. The shaped or made up dough rolls are allowed to proof for about one hour prior to baking. The dough is baked in an oven at 450 degrees F. for approximately 20 minutes or until the crust is sufficiently formed and golden brown in color. The rolls may then be cooled by any suitable means and packaged as desired.

Comparison

The effect of microwave exposure upon the food products of the invention versus conventional food products is shown by way of comparison of the "Improved Kaiser Roll" product, prepared according to the invention, to a "Traditional Kaiser roll" product. The Traditional Kaiser rolls were prepared from the following formulation:

| Traditional Kaiser Roll Formula | |
|---|---|
| Ingredients | Percent of Ingredients Per 100% of Wheat Flour |
| Wheat flour (patent flour) | 100.00 |
| Water | 52.00 |
| Yeast | 1.00 |
| Sugar | 2.00 |
| Shortening | 1.00 |
| Mineral Yeast Food | .50 |
| Salt | .50 |

The formulation was mixed into a dough at a temperature of 80° F. for approximately 12 minutes. The floor time between mixing and baking was 12 minutes. The dough was shaped into rolls and allowed to proof for about one hour before baking. The rolls were baked in an oven at 450° F. for approximately 20 minutes.

The following procedures for comparative testing were followed. Both the Improved Kaiser Rolls of the invention and the Traditional Kaiser Rolls were placed in a cooler and removed for heating with the temperature of the rolls being approximately 42 degrees F. The rolls were placed in a standard 1000 watt microwave oven on a paper napkin to absorb excess moisture and left uncovered. The rolls were to be served at approximately 130 to 138 degrees F. The microwave exposure of the 1000 watt unit was time set according to the number of rolls placed in the unit. When two rolls were placed in a microwave oven the unit was set for 15 seconds and the rolls were heated to 134 degrees F. When six rolls were placed in the oven, the unit was set for 45 seconds, and the rolls were heated to 130° F.

The rolls were comparatively sampled by a variety of people. The Traditional Kaiser Roll, when warmed in the microwave oven, was unanimously found to be unpalatable by reason of its toughness of crust. Further, the crumb of the Traditional Kaiser Rolls became rubbery and gummy and difficult to chew. In contrast, the Improved Kaiser Roll, prepared according to the present invention, remained soft and dry and retained its palatable qualities.

The yeast-raised wheat-based food products of the present invention have many advantageous applications. These products may be used and eaten without being exposed to microwave heating energy. The true advantage, of course, lies in the consumption of these food products when they are heated in a microwave oven.

Food products that may advantageously be prepared according to the present invention are sandwich rolls that are to be heated in a microwave from either a refrigerated or room temperature state, pizza crust for the making of pizza that is to be heated in a microwave, breakfast rolls and any other yeast-raised wheat-based food products intended to be heated in a microwave oven. Frozen food products are generally not advantageously prepared by microwave cooking because the ice in the product resists microwave energy, food products according to the invention that are frozen should, therefore, be defrosted or thawed before being heated in a microwave oven.

The scope of the present invention is not limited by the description, examples and suggested uses herein, and modifications can be made without departing from the spirit of the invention. For example, the yeast-raised wheat-based food products may be only partially baked for applications as "brown and serve" food products. These products may be browned by conventional oven methods and re-heated in a microwave oven. Thus, it is intended that the present invention cover the modifications and variations of this invention provided they come within the scope of the appended claims and their equivalents.

What is claimed is:

1. A yeast-raisable wheat-based roll which will substantially retain its palatability upon heating by microwave energy comprising wheat flour, yeast, and an effective amount of rice flour to reduce deterioration in the palatability of the roll upon heating by microwave energy.

2. A roll according to claim 1, wherein the rice flour is a long-grain flour and comprises from about 5 to about 60 percent by weight of the weight of the wheat flour.

3. A roll according to claim 2, wherein the long-grain rice flour comprises from about 10 to about 20 percent by weight of the weight of the wheat flour.

4. A roll according to claim 1 further comprising vital wheat gluten.

5. A roll according to claim 1 further comprising shortening.

6. A roll according to claim 1 wherein the roll is a Kaiser roll.

7. A roll according to claim 1 selected from the group consisting of sandwich, hamburger, hot dog, submarine or Kaiser rolls.

8. A roll according to claim 1 further comprising vital wheat gluten, water, and shortening.

9. A roll according to claim 8 further comprising egg, salt, mineral yeast food, malt, and syrup.

10. A method of making a yeast-raised wheat-based food product comprising the steps of:
preparing a formulation comprising wheat flour, yeast, and an effective amount of rice flour to reduce deterioration in the palatability of the food product upon heating by microwave energy;
mixing the formulation into a dough; and
baking the dough formulation for a time and at a temperature sufficient to form a yeast-raised wheat-based food product; and
heating the food product by exposing it to microwave energy.

11. A method according to claim 10 wherein the rice flour is a long-grain rice flour.

12. A method according to claim 10, wherein the formulation further comprises vital wheat gluten and shortening.

13. A method according to claim 10 wherein the formulation comprises
wheat flour, long-grain rice flour, water, syrup, shortening, salt, egg, yeast, malt, vital wheat gluten, mineral yeast food and commercial sour.

14. A method according to claim 10, 11, 12, or 13 wherein the rice flour is present in an amount in the range from about 5 to 60 percent of the weight of the wheat flour in the baking formulation.

15. A method according to claim 14 wherein the rice flour is added in an amount in the range from about 10 to 20 percent of the weight of the wheat four in the baking formulation.

16. A method according to claim 10, 11, 12, or 13 wherein the formulation is mixed for 6 to 30 minutes into a dough.

17. A method according to claim 16 wherein the formulation is mixed for 8 to 16 minutes into a dough.

18. A yeast-raised wheat-based pizza crust which will substantially retain its palatability upon heating by microwave energy comprising wheat flour, yeast, and an effective amount of rice flour to reduce deterioration in the palatability of the pizza crust upon heating by microwave energy.

19. A pizza crust according to claim 18 wherein the rice flour is a long-grain rice flour and comprises from about 5 to about 60 percent by weight of the weight of the wheat flour.

20. A pizza crust according to claim 19 wherein the long-grain rice flour comprises from about 10 to about 20 percent by weight of the weight of the wheat flour.

21. A method of making a yeast-raised wheat-based food product comprising the steps of:
providing a yeast-raised wheat-based food product comprising wheat flour, yeast, and an effective amount of rice flour to reduce deterioration in the palatability of the food product upon heating by microwave energy; and
heating the food product by exposing it to microwave energy.

22. A method according to claim 21, wherein the rice flour is a long-grain rice flour and comprises from about 5 to about 60 percent by weight of the weight of the wheat flour.

23. A method according to claim 22 wherein the long-grain rice flour comprises from about 10 to about 20 percent by weight of the weight of the wheat flour.

24. A method according to claim 21 wherein the food product is a roll.

25. A method according to claim 24 wherein the roll is selected from the group consisting of sandwich, hamburger, hot dog, submarine or Kaiser rolls.

26. A method according to claim 24 wherein the roll is a Kaiser roll.

27. A method according to claim 21 wherein the food product is a pizza crust.

28. A method according to claim 21 wherein the food product is a bread.

* * * * *